Sept. 1, 1953     L. G. ROLLINS ET AL     2,650,813
DISINTEGRATING AND GATHERING CHAIN STRUCTURE
Filed Aug. 6, 1949     5 Sheets-Sheet 1
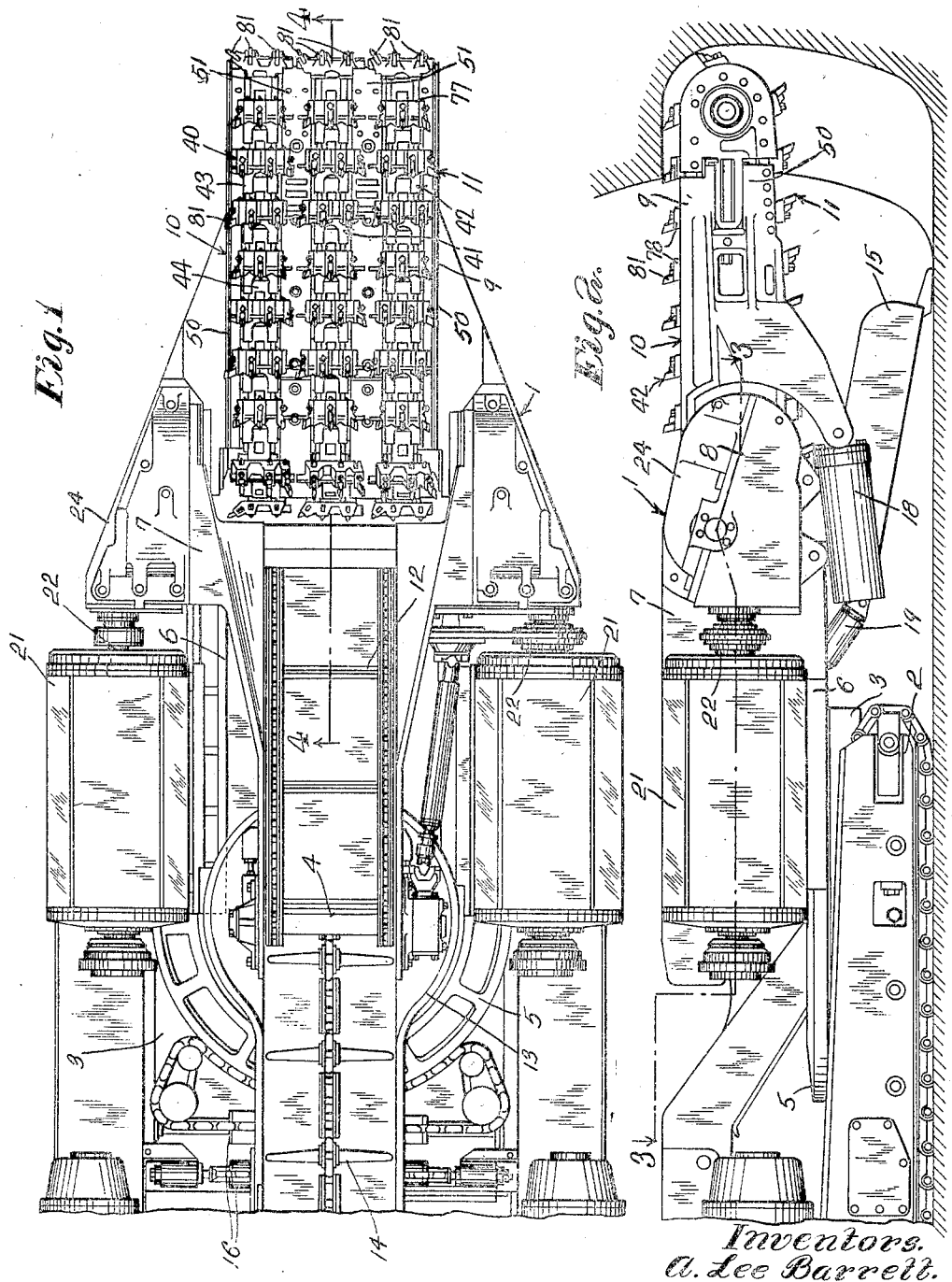
Inventors.
A. Lee Barrett.
Lester G. Rollins.
By Charles F. Osgood,
Attorney.

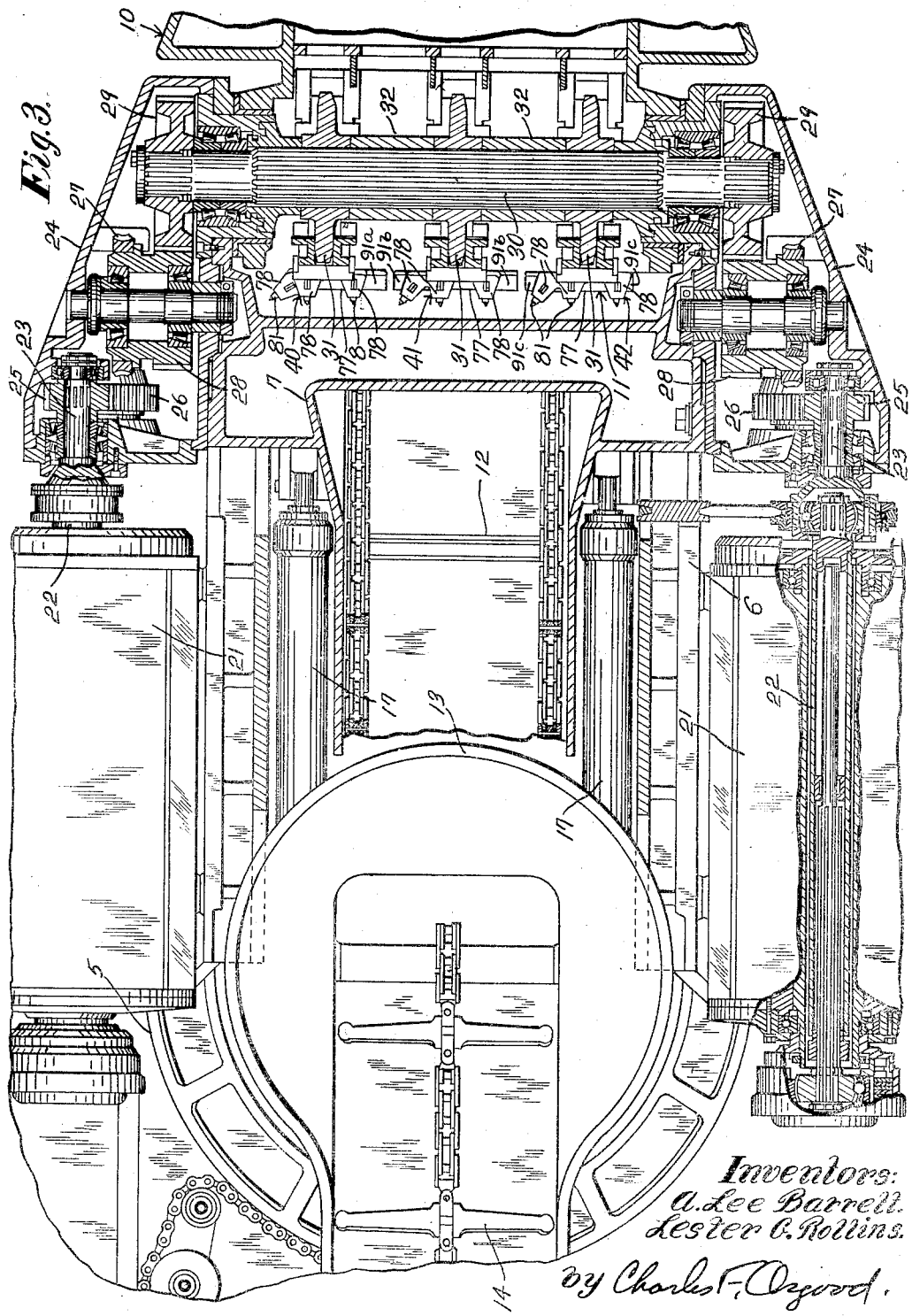

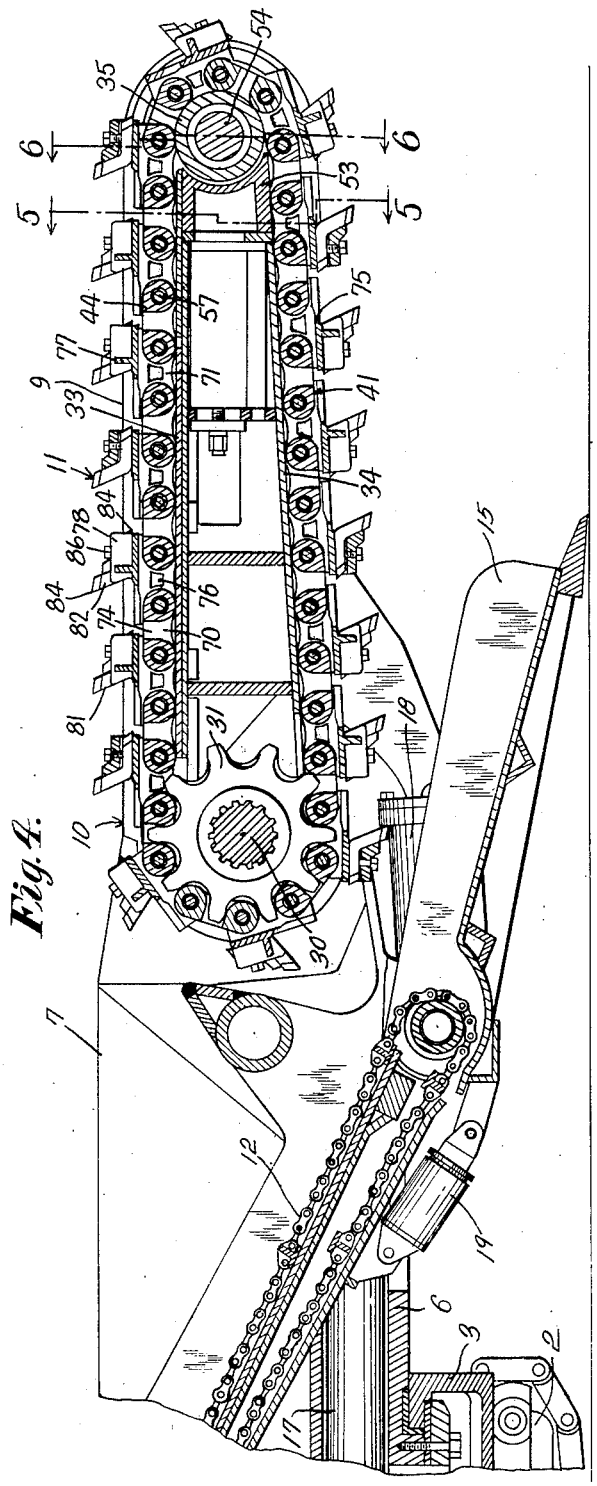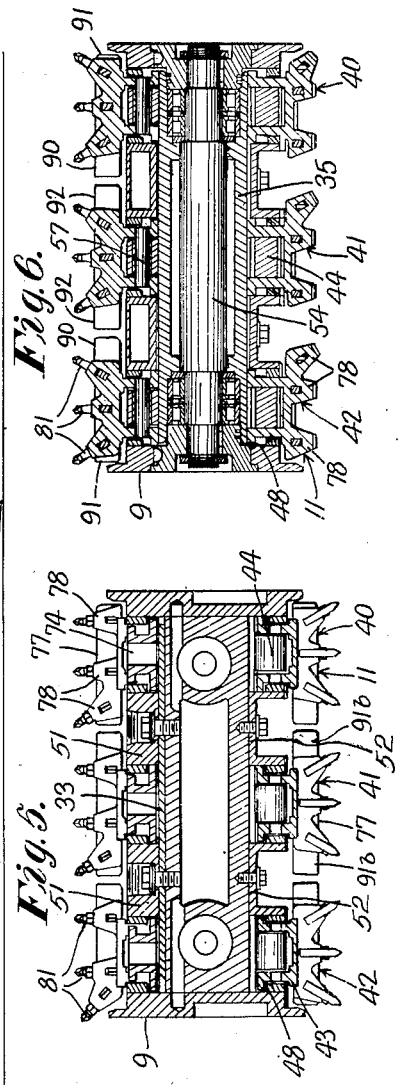

Sept. 1, 1953     L. G. ROLLINS ET AL     2,650,813
DISINTEGRATING AND GATHERING CHAIN STRUCTURE
Filed Aug. 6, 1949     5 Sheets-Sheet 4
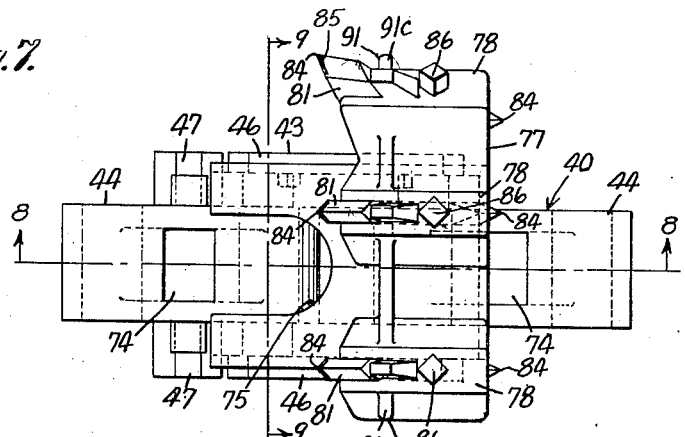
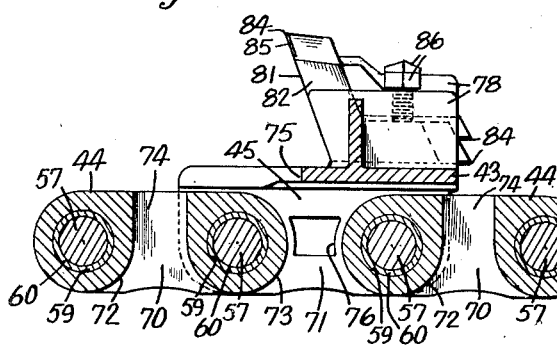
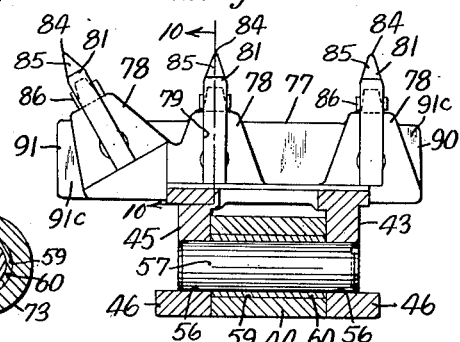
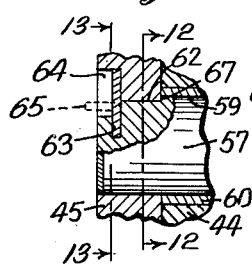
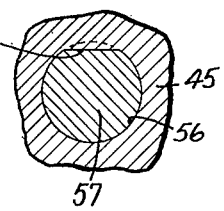
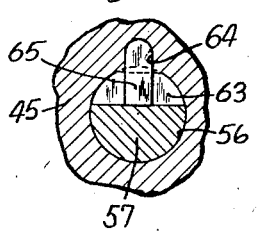
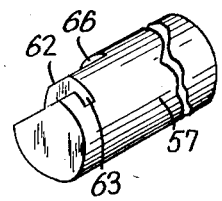
Inventors:
U. Lee Barrett.
Lester C. Rollins.
by Charles F. Osgood,
Attorney.

Sept. 1, 1953    L. G. ROLLINS ET AL    2,650,813
DISINTEGRATING AND GATHERING CHAIN STRUCTURE
Filed Aug. 6, 1949    5 Sheets-Sheet 5

Inventors:
A. Lee Barrett.
Lester G. Rollins.
by Charles F. Osgood,
Attorney.

Patented Sept. 1, 1953

2,650,813

UNITED STATES PATENT OFFICE 2,650,813

DISINTEGRATING AND GATHERING CHAIN STRUCTURE

Lester G. Rollins, Meriden, N. H., and Arthur Lee Barrett, Franklin, Pa., assignors to Joy Manufacturing Company, Pittsburgh, Pa., a corporation of Pennsylvania Application August 6, 1949, Serial No. 108,938

12 Claims. (Cl. 262—33)

This invention relates to mining chain structures and more particularly to a disintegrating and gathering chain structure especially designed for use with the vein-attacking and disintegrating head of a continuous mining apparatus.

In continuous mining apparatus of a known type, as for example a continuous mining apparatus of the type disclosed in the copending applications to John D. Russell, Serial No. 102,995, and John R. Sibley, Serial No. 102,996, both filed on July 5, 1949, and owned by the same assignee as the present invention, a mine vein-attacking and disintegrating head serves to attack in succession a series of relatively wide, vertical segments of coal or other mineral for dislodging the latter in relatively large fragments from a solid coal seam or mine vein. The attacking and disintegrating head, as is fully disclosed in the applications above mentioned, includes a vertically swingable frame or bar structure providing guideways on which a series of parallel disintegrating chains are guided for circulation in vertical orbital paths. These chains carry disintegrating instruments which dig into and rip or tear out the coal or other mineral as the attacking and disintegrating head is fed in a suitable manner with respect to the face of the seam or vein. The present invention contemplates improvements over known types of disintegrating chains in that it embodies a disintegrating chain structure which has both digging and gathering functions whereby the attacking and disintegrating head may effect rapid disintegration of the solid coal or other mineral and convey the dislodged coal or other mineral as it is dislodged, in an extremely effective manner. The disintegrating chain structure of the present invention is of the type which embodies a plurality of coacting endless chains having chain blocks providing transverse conveyor elements or cross bar portions which carry the disintegrating instruments, and the chain blocks are pivotally connected by strap links. The several chains cooperate not only to disintegrate the solid coal or other mineral but also to convey the disintegrated material rapidly away from the working face. The improved chain structure is compact and rugged in design, and may be operated rapidly to dig or tear away the coal or other mineral and to convey the dislodged coal or other mineral rapidly away from the face as it is dislodged, thereby greatly expediting the mining operation.

An object of the present invention is to provide an improved mining chain structure especially designed for use with the attacking and disintegrating head of a continuous mining apparatus. Another object is to provide an improved digging and gathering chain structure whereby coal or other mineral may be rapidly penetrated and dislodged from the solid and the dislodged material may be conveyed from the working face. Still another object is to provide an improved digging and gathering chain structure especially designed for use with the vein-attacking and disintegrating head of a continuous mining apparatus for dislodging coal or other mineral from the solid. A further object is to provide an improved disintegrating and gathering chain structure providing transverse conveyor elements or cross bars which cooperate to provide conveyor flights to convey the disintegrated material. A still further object is to provide an improved disintegrating and gathering chain structure which comprises a series of parallel disintegrating and gathering chains guided for movement in orbital paths and each comprising chain blocks pivotally connected by strap links and the blocks each having a transverse conveyor portion, and the conveyor portions of the chains coact to convey the disintegrated material. Another object is to provide an improved disintegrating and gathering chain structure which embodies a series of parallel endless disintegrating and gathering chains each having a series of cross bar portions which support the disintegrating instruments and which cooperate to convey the disintegrated material. Yet another object is to provide an improved disintegrating and gathering chain structure including a series of coacting endless chains each embodying a series of tooth carrying chain blocks pivotally connected by strap links with the blocks and strap links having guides which cooperate with guiding means of a bar structure and each having pockets for receiving the teeth of a chain driving sprocket. A still further object is to provide an improved disintegrating and gathering chain structure wherein the chain blocks which carry the disintegrating teeth are formed with transverse portions which cooperate to provide conveyor flights. Still another object is to provide an improved disintegrating and gathering chain structure having novel features of construction and design. These and other objects and advantages of the invention will, however, hereinafter more fully appear in the course of the ensuing description.

In the accompanying drawings there is shown for purposes of illustration one form which the invention may assume in practice.

In these drawings:

Fig. 1 is a plan view of a continuous mining apparatus, with the rearward portion omitted, in which an illustrative form of the improved disintegrating and gathering chain structure is embodied.

Fig. 2 is a side elevational view of the mining apparatus shown in Fig. 1.

Fig. 3 is an enlarged horizontal sectional view taken substantially on line 3—3 of Fig. 2.

Fig. 4 is an enlarged central longitudinal vertical sectional view taken substantially on line 4—4 of Fig. 1, illustrating the vein-attacking and disintegrating head.

Figs. 5 and 6 are cross sectional views taken respectively on lines 5—5 and 6—6 of Fig. 4.

Fig. 7 is an enlarged fragmentary plan view of one of the side disintegrating and gathering chains.

Fig. 8 is a longitudinal vertical sectional view taken on line 8—8 of Fig. 7.

Fig. 9 is a cross sectional view taken on line 9—9 of Fig. 7.

Fig. 10 is a detail vertical sectional view taken on line 10—10 of Fig. 9.

Fig. 11 is a detail sectional view taken through one of the hinge pins, showing the pin lock.

Figs. 12 and 13 are detail cross sectional views taken respectively on lines 12—12 and 13—13 of Fig. 11.

Fig. 14 is a perspective view of one of the hinge pins.

Figure 15:
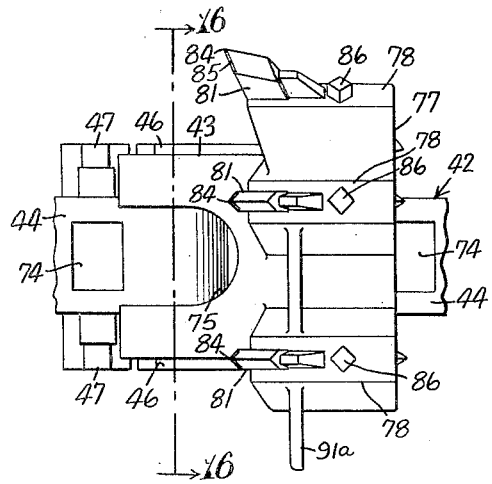

Fig. 15 is a plan view similar to Fig. 7 of the other side disintegrating and gathering chain.

Figure 16:
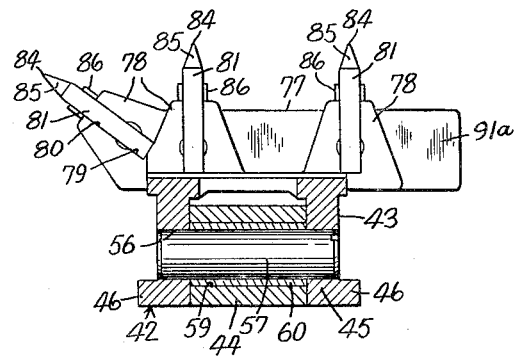

Fig. 16 is a cross sectional view taken on line 16—16 of Fig. 15.

Figure 17:
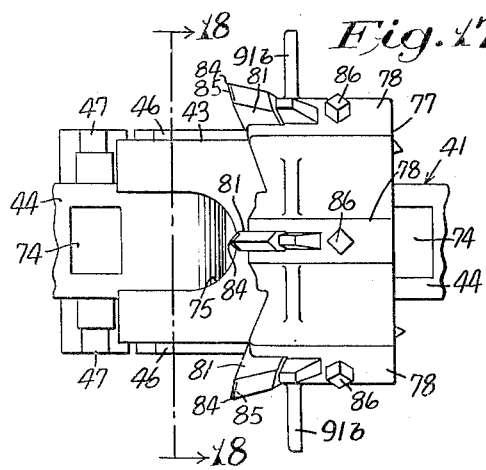

Fig. 17 is a plan view similar to Figs. 7 and 15 of a portion of the central disintegrating and gathering chain.

Figure 18:
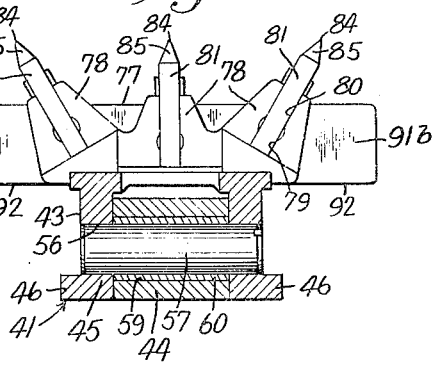

Fig. 18 is a cross sectional view taken on line 18—18 of Fig. 17.

In this illustrative embodiment of the invention, the improved disintegrating and gathering chain structure is shown incorporated in a continuous mining apparatus of the type fully disclosed in the above mentioned Russell and Sibley applications. The improved disintegrating and gathering chain structure is also of a type which may be associated with continuous mining apparatus such as that disclosed in an application of Harold F. Silver, Serial No. 11,688, filed February 27, 1948, also owned by the assignee of the present invention, and it will further be understood that the invention may be embodied in various other types of digging and disintegrating equipment.

The continuous mining apparatus shown herein is generally designated 1 and includes a mobile base 2, desirably a crawler base, having a frame 3, and swivelly mounted on the base frame at 4 to swing in horizontal planes with respect to the base is a frame 5. The swivelled frame 5 has a forwardly projecting frame portion 6 projecting in advance of the base and providing horizontal guideways on which a slidable frame 7 is guided for rectilinear horizontal movement along radial lines with respect to the swivel axis 4. Pivotally mounted at 8 on the sliding frame to swing in vertical planes with respect thereto is a frame or bar structure 9 of a vein-attacking and disintegrating head 10, and the improved disintegrating and gathering chain structure generally designated 11 is guided for circulation in a vertical orbital path about guideways on the frame structure 9. The attacking and disintegrating head may be operated to dig into and tear loose large fragments of the solid coal or other mineral from the coal seam or mine vein and the disintegrated material is moved rearwardly by the top runs of the disintegrating chain structure and discharged onto a front conveyor 12 which conveys the disintegrated material rearwardly to discharge into a hopper 13 arranged coaxially with the swivel 4 and carried by the base frame. A rear discharge conveyor 14 removes the disintegrated material from the hopper and conveys the disintegrated material rearwardly of the apparatus to a suitable point of delivery. A device 15 employed in effecting cleaning up of the floor is arranged beneath the attacking and disintegrating head.

As is fully disclosed in the above mentioned Russell and Sibley applications hydraulic cylinder and piston devices 16, 16 mounted transversely on the base are operatively connected to the frame 5 for swinging the attacking and disintegrating head horizontally about the swivel axis 4 relative to the base. Hydraulic cylinder and piston devices 17, 17 extending longitudinally in parallelism on the swivelled frame 5 are operatively connected to the sliding frame 7 for moving the attacking and disintegrating head back and forth along the frame guideways. Hydraulic cylinder and piston devices 18 are connected between the sliding frame and the frame structure 9 for swinging the attacking and disintegrating head in vertical planes about the pivot 8. A hydraulic cylinder and piston device 19 is provided for tilting the device 15 upwardly. Since these cylinder and piston devices and the hydraulic system and control valve means therefore are fully disclosed in the above mentioned Russell and Sibley applications further description thereof is herein unnecessary.

As is also disclosed in the Russell and Sibley applications above referred to, motors 21, 21 on the swivelled frame 5 at the opposite sides of the hopper 13, are connected by self-adjusting, telescopic drive shaft connections 22 to longitudinal shafts 23 (Fig. 3) suitably journaled in gear housings 24 attached to the opposite sides of the forward portion of the sliding frame 7. Gears 25 fixed to these shafts mesh with gears 26 secured to parallel shafts likewise suitably journaled in the gear housings. Secured to these parallel shafts are worms (not shown) meshing with worm wheels 27 which drive spur gears 28 meshing with spur gears 29 keyed to the opposite ends of a transverse shaft 30, arranged with its axis in coincidence with the pivotal axis 8 of the swingable frame structure 9. A plurality of chain drive sprockets 31 are keyed to the shaft 30 and engage and drive the disintegrating and gathering chain structure 10, to effect circulation of the latter about the guideways on the frame structure with its upper run moving rearwardly. Arranged on the shaft intermediate the chain sprockets are spacing sleeves 32. The swingable frame or bar structure 9 includes top and bottom plates 33 and 34 and carried at the outer end of the frame structure is an elongated cylindrical guide roller 35, and the disintegrating chain structure 11 is guided along these plates and about the guide roller. Since the driving means for the disintegrating chain structure and the bar structure are fully disclosed in the Russell and Sibley applications further description thereof is herein unnecessary.

Now referring to the detail structure of the improved disintegrating and gathering chain structure 11, it will be observed that a plurality, herein desirably three, endless chains 40, 41 and 42 are arranged in parallel relation to circulate in parallel vertical orbits along the guideways of the bar structure, and each of these chains comprises a series of chain blocks 43 pivotally connected by strap links 44. The blocks have bases 45 of generally inverted U-shape in cross section, as shown in Fig. 9, and formed at the sides of the block bases and the strap links are lateral gibs 46 and 47 respectively which are slidingly received in guideways 48 provided by the bar structure, for guiding the chains in their orbital paths. The bar structure includes vertical side plates 50 to which the top and bottom plates 33 and 34 are suitably secured, and guide members 51, 52 are fixed to the top and bottom plates and cooperate to provide the guideways 48. The outer portion or tip end of the bar structure is provided with an adjustable head portion 53, in a manner similar to that described in the Russell and Sibley applications above referred to, and a transversely extending horizontal shaft 54 is supported within the sides of this adjustable head portion (Fig. 6) and supports bearings on which the guide roller 35 is rotatably mounted. The endless chains as they move about the outer end of the bar structure pass around and are guided by the guide roller as above mentioned.

The sides of the inverted generally U-shaped base of each chain block 43 have parallel front and rear transverse bores 56 and the pairs of aligned bores at the ends of the block receive hinge pins 57. The strap links have parallel transverse bores 59 which have wear bushings 60 pressed or otherwise secured therein and the hinge pins pass through the bores of the bushings as shown in Figs. 8 and 9. Upon assembly of the chain, the bushing bores of the strap links are brought into registry with the block bores and the hinge pins are driven axially into position, in a manner well known to those skilled in the art. To prevent rotation of the hinge pins relative to the chain blocks the bores 56 in one side of each block-base are flattened at 61 to provide plane surfaces (Fig. 12) and the pins are flattened at 62 (Fig. 14) at one end to provide plane faces for engagement with the surfaces 61. The pins are transversely slotted at 63 at one end and one side of each block base is exteriorly grooved at 64 (Figs. 11 and 13) with the grooves entering the adjacent bores 56. Receivable in each slot 63 is one end of an angular locking element 65 (shown in dotted lines in Fig. 11) and the locking element is bent into straightened position into the adjacent groove 64 in the manner shown. Thus when the locking elements 65 are placed in locking position, the hinge pins are locked against axial movement in one direction with respect to the blocks. Shoulders 66 at the inner ends of the plane faces 62 on the pins engage at 67 the adjacent inner surfaces of the sides of the block-bases to prevent axial displacement of the pins in the opposite direction. Thus the hinge pins 57 are locked both against rotation and axial movement with respect to the blocks. Evidently, the hinge pins may be removed from the chain blocks, simply by bending the locking elements 65 into the dotted line position shown in Fig. 11, and driving the pins axially from the block-bores.

In this illustrative construction, the strap links have centrally located pockets 70 for receiving the teeth of the driving sprocket (Fig. 4), and tooth-receiving-pockets 71 are provided within the bases of the blocks, and the sprocket teeth drivingly engage the curved front walls 72 of the pockets 70 and the curved rear ends 73 of the strap links. The pockets in the strap links open outwardly at 74 through the tops of the links for discharging any dirt which might enter the pockets 70 and the tops and sides of the block bases are cut away at 75 and 76 for discharging dirt from the pockets 71, thereby to prevent clogging of the chain and resultant jamming of the sprocket teeth.

The chain blocks have transverse portions 77 at the tops of their bases and formed integral with these transverse portions are projecting lugs 78 having longitudinal sockets 79 (Fig. 10) and front slots 80 for receiving reversible, double ended digging instruments or teeth 81. The socket lugs and digging teeth are herein similar to those disclosed in the copending application of Joseph F. Joy Serial No. 57,047 filed October 28, 1948. The cutter bits each have a body formed by relatively inclined portions 82 and 83 spaced at an obtuse angle and terminating in disintegrating or digging points 84 at the opposite extremities of the bit. The front faces of the disintegrating or digging points are desirably protected by hard facing material or hard metal inserts 85 for resisting wear. The teeth are reversible end for end to present either digging point to the work and either portion of the bodies of the teeth is receivable in the lug sockets, and set screws 86 threaded in top openings 87 in the lugs are adjustable into engagement with the inactive tooth portions received in the lug sockets for securing the teeth in position on the lugs with the active digging portions projecting forwardly and outwardly from the lugs in the manner shown. When one digging point of a tooth becomes dull, the set screw 86 may be released and the tooth withdrawn from the lug socket, and the tooth may be reversed end for end and reinserted in the lug socket and again secured in position by the set screw in the manner disclosed in the application Serial No. 57,047 above referred to.

The side chains 40 and 42 are identical in design while the middle chain 41 is slightly different from the other two. The transverse portions may be in the form of cross bars or plates which provide lateral end portions 90 and 91, and as shown in Fig. 6, the inner end portions 90 of the side chains are somewhat shorter than the outer end portions 91, while on the middle chain the lateral end portions 92, 92 are of the same length. The intermediate portions of the transverse portions 77 desirably are in the form of webs between the lugs 78. Certain of the chain blocks of the side chains 40 and 42 have their lateral portions at their inner sides in the form of narrow vanes or lugs 91a while certain of the chain blocks of the central chain 41 have both of their end portions in the form of narrow vanes or lugs 91b as shown in Fig. 17. Others of the blocks, as shown in Fig. 9, have narrow vanes or lugs 91c at their ends projecting laterally a small distance from the outermost lugs 78. The narrow lugs 91a, 91b and 91c are of the same lateral and vertical dimensions as the outer end portions 90 and 91 of the transverse portion of the chain block. Also, the blocks on the several chains vary slightly due to the staggered location of the lugs 78 on different blocks to provide for proper lacing of the teeth (see Figs. 9, 16 and 18). Thus each block may be in the form of a transverse conveyor plate or crossbar, having integral tooth-carrying lugs. These lateral portions provide cross bars or flight elements and the cross bars of the three chains are arranged in close end to end alignment transversely of the disintegrating head so that they cooperate to serve as conveyor flights to gather the disintegrated material and to move the disintegrated material rearwardly along the top of the disintegrating head.

The digging and gathering chains during use are rapidly circulated about their guideways on the swingable frame or bar structure 9 and the cross bars of the top runs of the chains move rearwardly along the plane outer surface of the top plate 33 and cooperate to convey the disintegrated material rearwardly as it is dislodged from the solid coal seam or mine vein, and the tips of the digging teeth, as the tooth-carrying blocks move rectilinearly along the top guideways of the head, lie substantially in a common transverse plane to provide what is known as a "table top" arrangement of the teeth. The digging teeth move in a curved path as they pass around the guide roller 35 at the outer end of the bar structure and then move in a straight path rearwardly so that as the chains are fed into the coal or other mineral the latter is rapidly dislodged in relatively large fragments from the solid seam or vein in an extremely effective manner.

As a result of this invention an improved mining chain structure is provided which is rugged and compact in design and which is extremely efficient in operation. By the provision of the cross conveyor flights which are provided by the cooperating tooth-carrying transverse bar portions of the chains the material is effectively dislodged by the teeth and conveyed by the cross flights rearwardly away from the working face. The novel structure of the chain blocks and strap links and the novel arrangement of the tooth-carrying cross bars on the chain blocks result in a distintegrating and gathering chain which is simple and rugged in design and which due to its novel construction is substantially non-clogging. By the provision of the tooth-receiving pockets in the chain blocks and strap links the sprocket teeth drivingly engage the chains in an extremely effective manner. Other advantages of the invention will be clearly apparent to those skilled in the art.

While there is in this application specifically described one form which the invention may assume in practice, it will be understood that this form is shown for purposes of illustration only and that the invention may be modified and embodied in various other forms without departing from its spirit or the scope of the appended claims.

What we claim as new and desire to secure by Letters Patent is:

1. An endless disintegrating and gathering chain structure having its upper run movable along an upper plane conveying surface of a guide frame about which the chain structure is adapted to circulate in an orbital path, said chain structure comprising a series of parallel endless chains having base portions guided by said frame, the guided base portions of said chains arranged in spaced apart parallelism longitudinally of said plane conveying surface with the base portions of the outermost chains spaced inwardly from the outer sides of said conveying surface and the adjacent sides of the base portions of the chains spaced relatively widely apart, said chains comprising a series of articulated chain blocks spaced at intervals along the length of the chains and each comprising a relatively narrow, laterally elongated, cross bar portion having laterally spaced socketed lugs integral therewith for receiving disintegrating teeth and disposed in staggered relation at different angles on different blocks, said cross bar portions of said blocks being of uniform length, certain of said cross bar portions having lateral conveyor projections extending laterally at the ends of said cross bar portions beyond the block bases and the outermost lugs, said lateral conveyor projections at the outer sides of the outer chains extending laterally over the plane conveying surface, and said conveyor projections at the adjacent sides of said chains extending over the conveying surface across the spaces between the chains with their adjacent ends disposed close together, said cross bar portions having transverse web-like portions between the laterally spaced lugs thereof whereby said lateral conveyor projections and said transverse web portions cooperate with said lugs to provide said cross bar portions of said blocks, and said cross bar portions of the several chains arranged in end to end alignment and cooperating to provide conveyor flights movable along the plane conveying surface of the guide frame to move material disintegrated by said teeth longitudinally along such surface.

2. The combination with a guide frame having a plane upper surface, of an endless disintegrating and gathering chain structure comprising a series of parallel endless chains movable in orbital paths about said guide frame and having their upper runs movable along the plane upper surface, said chains arranged in side by side relation in common transverse planes and the guided base portions of the chains arranged in spaced apart parallelism longitudinally of said plane upper surface with the base portions of the outermost chains spaced inwardly of the outer sides of said conveying surface and the adjacent sides of the base portions spaced apart to provide relatively wide spaces between the base portion, said chains including a series of tooth-carrying chain blocks pivotally connected together, each block having a relatively narrow, laterally elongated, cross bar portion projecting laterally beyond the sides of the block bases and providing a plurality of tooth supports with the latter arranged in staggered relation at different angles on different blocks, said projecting ends of said cross bar portions extending laterally over the conveying surface at the outer sides of the base portions of the outer chains and said conveyor portions at the adjacent sides of the block bases extending over the conveying surface across the spaces between the base portions of the chains with their adjacent ends close together, said cross bar portions of the several chains being arranged in end to end, transverse, alignment and cooperating to provide conveyor flights extending substantially across the plane upper surface for moving material disintegrated by said teeth longitudinally along such surface.

3. A disintegrating and gathering chain structure as set forth in claim 2 wherein certain of said cross bar portions have lateral projections extending laterally at the ends of said bar portion beyond the outermost tooth supports thereon and said cross bar portions having transverse weblike portions between the tooth supports thereof in alignment with said lateral projections whereby said lateral projections and said transverse web portions cooperate with said tooth supports to provide said conveyor flights.

4. A disintegrating and gathering chain structure as set forth in claim 1 wherein said series of chain blocks of said chains are pivotally connected by strap links, said blocks and strap links have internal pockets for receiving the teeth of drive sprockets with the sprocket teeth engaging the front walls of said pockets during driving of the chains, and said block-pockets located between adjacent ends of said strap links inwardly beneath said cross bar portions.

5. A disintegrating and gathering chain as set forth in claim 4 wherein said blocks and strap links have openings communicating with said pockets at the outer surface of the chain for venting any dirt which might accumulate in said pockets outwardly from said pockets.

6. A disintegrating and gathering chain as set forth in claim 5 wherein said chain blocks have additional side vent openings for the pockets therein whereby any dirt entering the pockets of the blocks may be discharged laterally as well as outwardly.

7. A disintegrating and gathering chain structure as set forth in claim 1, wherein the series of chain blocks of said chains are pivotally connected by strap links, and said blocks have bases of generally U-shaped cross section and said strap links project into the spaces within the block bases between the sides thereof, and hinge pins are secured in bores in the sides of said block bases and passing through bores in the strap links.

8. A disintegrating and gathering chain structure as set forth in claim 7 wherein said U-shaped block bases of said chains provide pockets beneath said cross bar portions intermediate adjacent strap links for receiving sprocket teeth of drive sprockets with the sprocket teeth drivingly engaging the rear ends of the strap links within the block bases.

9. An endless disintegrating and gathering chain structure movable in an orbital path and having its upper run movable along a plane upper conveying surface of a guide frame, said chain structure comprising a series of parallel endless chains having base portions guided by said frame, and the base portions of the several chains arranged in spaced apart parallelism longitudinally of said guide frame with the base portions of the outermost chains spaced inwardly from the outer sides of the conveying surface and the base portions at the adjacent sides of the chains spaced apart to provide wide spaces between the base portions, said chains comprising a series of chain elements pivotally connected together, certain of said chain elements having relatively narrow, laterally elongated, transverse bar portions projecting laterally in opposite directions from the sides thereof each bar portion having a plurality of laterally spaced tooth-carrying lugs integral therewith and disposed in staggered relation at different angles on different bar portions, the projecting ends of said bar portions at the outer sides of the base portions of the outermost chains extending laterally over the plane conveying surface and the projecting ends of said bar portions at the adjacent sides of the base portions extending over the conveying surface across the spaces between the base portions with their adjacent ends close together, and said bar portions and said laterally spaced lugs of the several chains arranged in end to end alignment and cooperating to provide transverse conveyor flights movable along the plane conveying surface of the guide frame to move material disintegrated by the lug-teeth longitudinally along such surface.

10. A disintegrating and gathering chain structure adapted for association with a guide frame having a plane upper conveying surface, comprising a plurality of parallel endless chains guided for orbital movement about said guide frame, said chains arranged in side by side relation in common transverse planes with their upper runs movable along the plane conveying surface, the guided base portions of the outermost chains being spaced inwardly from the outer sides of said plane conveying surface and the adjacent sides of the base portions of the chains being spaced apart to provide relatively wide spaces therebetween, each chain including a series of chain blocks pivotally connected together and having transverse bar portions projecting laterally in opposite directions from the sides thereof, said transverse bar portions each having a plurality of laterally spaced tooth-carrying lugs integral therewith with the lugs disposed in staggered relation at different angles on different blocks, the projecting ends of said transverse bar portions at the outer sides of the base portions of the outermost chains extending outwardly over said conveying surface and said bar portions at the adjacent sides of the base portions extending over the conveying surface across the spaces between the base portions with their adjacent ends close together, said transverse bar portions and said lugs with the transverse bar portions of the several chains arranged in end to end alignment and cooperating to provide transverse conveyor flights extending substantially across the plane conveying surface, and said flights moving along the plane conveying surface of the guide frame to move material disintegrated by the lug-teeth longitudinally along such surface.

11. An endless disintegrating and gathering chain adapted for association with a guide frame having a plane upper conveying surface with the upper run of said chain movable along the chain conveying surface, said chain comprising a series of chain blocks pivotally connected by strap links, each chain block having a generally U-shaped base with the sides of the bases disposed outside of said strap links, the block bases of the outermost chains spaced inwardly from the outer sides of said plane conveying surface and the adjacent sides of said block bases spaced apart to provide relatively wide spaces therebetween, a transverse bar portion integral with each block-base and projecting laterally in opposite directions from the sides of said base, said bar portions overlying and disposed in close adjacency to the plane upper surface, said bar portions projecting laterally from the block bases of the outermost chains over said conveying surface and said bar portions projecting laterally from the adjacent sides of said block bases over said conveying surface across the spaces between the block bases with the adjacent ends of said bar portions disposed close together, and tooth-carrying lugs integral with said cross bars and spaced laterally in staggered relation at the top thereof, said cross bars and said spaced lugs of the several chains arranged in end to end alignment and cooperating to provide conveyor flights extending across and moving along the plane conveying surface of the guide frame to move material disintegrated by said lug-teeth longitudinally along such surface.

12. The combination as set forth in claim 2, wherein the guide frame has longitudinal guideways disposed in parallel relation inwardly of and below said plane upper surface, the block-bases being guided for movement along said guideways, and said cross bar portions projecting laterally from the block-bases exteriorly of said guideways and disposed over and in close adjacency to said plane upper surface.

LESTER G. ROLLINS.
ARTHUR LEE BARRETT.

References Cited in the file of this patent

UNITED STATES PATENTS

| Number | Name | Date |
|---|---|---|
| 1,244,785 | Sessions | Oct. 30, 1917 |
| 1,468,866 | Morgan | Sept. 25, 1923 |
| 1,469,132 | Wilson | Sept. 25, 1923 |
| 1,588,563 | Wilson | June 15, 1926 |
| 2,046,024 | Lee | June 30, 1936 |
| 2,107,942 | Holmes | Feb. 8, 1938 |
| 2,125,296 | Joy | Aug. 2, 1938 |
| 2,189,669 | Lewis | Feb. 6, 1940 |
| 2,398,675 | Sloane | Apr. 16, 1946 |

FOREIGN PATENTS

| Number | Country | Date |
|---|---|---|
| 337,281 | Great Britain | Nov. 6, 1930 |